United States Patent
Hatano

(10) Patent No.: US 8,907,283 B2
(45) Date of Patent: Dec. 9, 2014

(54) BATTERY-OPERATED OBJECT DETECTING DEVICE

(71) Applicant: Optex Co., Ltd., Otsu-shi, Shiga (JP)

(72) Inventor: Tsuyoshi Hatano, Otsu (JP)

(73) Assignee: Optex Co., Ltd., Shiga (JP)

( * ) Notice: Subject to any disclaimer, the term of this patent is extended or adjusted under 35 U.S.C. 154(b) by 127 days.

(21) Appl. No.: 13/671,179

(22) Filed: Nov. 7, 2012

(65) Prior Publication Data

US 2013/0112877 A1    May 9, 2013

(30) Foreign Application Priority Data

Nov. 8, 2011   (JP) .................................. 2011-244397

(51) Int. Cl.
G01J 5/00 (2006.01)
G08B 29/18 (2006.01)
G01J 5/10 (2006.01)
G08B 13/183 (2006.01)

(52) U.S. Cl.
CPC ................. *G01J 5/10* (2013.01); *G08B 29/181* (2013.01); *G08B 13/183* (2013.01)
USPC ....................................................... 250/338.1

(58) Field of Classification Search
CPC .. G08B 29/181; G08B 13/183; G08B 13/191; G01J 5/10
USPC .......................................... 250/338.1–338.5
See application file for complete search history.

(56) References Cited

U.S. PATENT DOCUMENTS

| | | | |
|---|---|---|---|
| 3,967,258 A | 6/1976 | Bucy, Jr. | |
| 5,287,286 A * | 2/1994 | Ninomiya | ........................ 702/63 |
| 2010/0194564 A1 | 8/2010 | DiPoala | |

FOREIGN PATENT DOCUMENTS

| | | | |
|---|---|---|---|
| JP | 2002-367045 A | 12/2002 | |
| WO | 9830987 A2 | 7/1998 | |

OTHER PUBLICATIONS

European Search Report, Application No. 12190617.6-1803; Feb. 27, 2013.
Communication pursuant to Article 94(3) EPC issued by the European Patent Office on Apr. 2, 2014 in corresponding European patent application No. 12190617.6.

* cited by examiner

*Primary Examiner* — Kiho Kim
(74) *Attorney, Agent, or Firm* — Sughrue Mion, PLLC

(57) ABSTRACT

A battery-operated object detecting device (D) includes a detecting unit (U) adapted to be driven by an electric cell (12) mounted thereon, and a transmitting device (20) driven by the electric cell (12) in the detecting unit (U) for wireless transmitting at least a low battery signal being indicative of a reduction in voltage of the electric cell (12). An electric power sharing unit (30) for outputting a supply voltage to the transmitting device (20) includes a voltage changing circuit (32) for changing, based on a low battery detection result from a low battery detecting circuit (13), to a voltage necessary for causing a low battery determining circuit (21) of the transmitting device (20) to change the supply voltage from the electric cell (12) to a voltage for determining a low battery state.

3 Claims, 6 Drawing Sheets

BATTERY-OPERATED OBJECT DETECTING DEVICE

CROSS REFERENCE TO THE RELATED APPLICATION

This application is based on and claims Convention priority to Japanese patent application No. 2011-244397, filed Nov. 8, 2011, the entire disclosure of which is herein incorporated by reference as a part of this application.

BACKGROUND OF THE INVENTION

1. Field of the Invention

The present invention relates to a battery-operated object detecting device for detecting an object and then outputting a detection information signal.

2. Description of Related Art

Object detecting devices such as AIR (Active Infrared Ray) type object detecting devices and PIR (Passive Infrared Ray) type object detecting devices, both utilizing detection beams such as, for example, infrared rays (IR) have hitherto been well known. Those object detecting devices are generally used for security purpose and in automatic door systems. For example, the AIR type object detecting device includes a detecting unit made up of a light projector for projecting a detection beam for use in detecting an object and a light receiver disposed in face to face relation with the light projector for receiving the detection beam and subsequently outputting a detection signal and is so designed that the object can be detected in reliance on a change in amount of light received (a detection signal level) that is caused by an intervention between the two optical systems and, based on this, a detection information signal such as, for example, a warning signal and/or a door closing or opening signal.

As an example of the prior art object detecting devices, a security device has hitherto been suggested in, for example, the patent document 1 listed below, in which for the purpose of optical adjustment of a detecting unit a transmitter provided in a light receiver for transmitting the amount of received light so that a receiver provided in a light projector can receive the amount of the received light. It has also been known that a warning signal is transmitted by a transmitting unit, provided within a light receiver, to a receiving unit provided outside an object detecting device.

On the other hand, in recent years, it has become quite often that in order to minimize the low power consumption and complications in electric wiring work, the object detecting device comes to be driven by an electric cell (battery) mounted inside the detecting unit. In such device, in order to avoid an undesirable erroneous operation and a device failure, both of which may be brought about consequent upon extreme lowering of the electric cell power, the need has been recognized to detect a low battery state, indicative of the lowering of the electric cell power, to enable a monitoring at all times, in which case separate from an alarming signal transmitting unit or the like for transmitting, for example, a warning signal, a low battery signal transmitting unit is employed to transmit a low battery signal indicative of the low battery state detected.

FIG. 7 of the accompanying drawings illustrates a perspective showing an exemplary light receiver employed in the conventional battery driven object detecting device. This light receiver, generally identified by 52, is accommodated within a housing made up of a sensor covering 56 and a back box 57. Since a warning signal is generally transmitted from the light receiver 52, the light receiver 52 is of such a structure that two battery driven transmitting units, made up of a warning signal transmitting unit 71 and a low battery signal transmitting unit 72, are accommodated within an upper portion of the interior 57a of the back box 57 and, on the other hand, an electric cell (battery) 62 is accommodated within a lower portion therebelow. A cell storage chamber 75 in the warning signal transmitting unit 71 accommodates therein an electric cell 76 and a cell storage chamber 77 in the low battery signal transmitting unit 72 accommodates therein an electric cell 78. Within a light projector not shown, other than the electric cell only the low battery signal transmitting unit is accommodated.

Each of the warning signal transmitting unit 71 and the low battery signal transmitting unit 72 is provided therein with a circuit for determining whether or not the voltage of the respective electric cells 76 and 78 employed in the corresponding transmitting unit 71 and 72 is reduced down to a value lower than a predetermined reference value, and a low battery signal indicative of a low battery state of the electric cells 76 and 79 of the respective transmitting unit 71 and 72 is also transmitted. It is quite often that the low battery signal transmitting unit 72 is employed in the form of any existing transmitting unit with no modification made thereto and, in such case, different batteries and different low battery reference values are often employed in the warning signal transmitting unit and the low battery signal transmitting unit.

PRIOR ART LITERATURE

[Patent Document 1] JP Laid-open Patent Publication No. 2002-367045

DISCLOSURE OF THE INVENTION

It has, however, been found that where different batteries are employed in the warning signal transmitting unit and the low battery signal transmitting unit, respectively, it is quite often that those batteries have to be separately replaced with new ones when respective low battery states are detected, thus requiring complicated replacement works. Also, where the respective batteries employed in the warning signal transmitting unit and the low battery signal transmitting unit have different lifetimes, it is also quite often that both of those batteries are simultaneously replaced based on one of the batteries which has become dead earlier than the other of those batteries and, therefore, the replacement of the other of the batteries while such other of the batteries has a still available battery capacity is indeed uneconomic.

In the object detecting device of a type provided with a plurality of, for example, two, sets of detecting units, a receiving channel section of an external receiving device of the object detecting device requires, for each of the detecting units, six channels in total including two channels for the warning signal and low battery signal transmitting devices in the light receiver, one channel for the low battery signal transmitting device in the light projector and three channels for the low battery detection signal in connection with the electric cell mounted on each of the transmitting devices, and, therefore, the two sets of the detecting units requires the total number of 12 channels and, in the case of the 8-channel receiving device, two pieces are required, thus resulting in high costs.

In view of the foregoing, the present invention has been devised to substantially eliminate the foregoing problems and inconveniences and is intended to provide a battery-operated object detecting device effective to transmit a low battery signal indicative of a low battery state of the battery with a low-cost and simplified structure.

In order to accomplish the object of the present invention as discussed above, the present invention provides a battery-operated object detecting device, which includes a detecting unit adapted to be driven by an electric cell mounted thereon; and a transmitting device driven by the electric cell in the detecting unit for transmitting wireless at least a low battery signal from the detecting unit and the detection information signal, the low battery signal being indicative of a reduction in voltage of the electric cell.

The term "detecting unit" referred to above is to be understood as including, for example, a light projector for projecting a detection beam and a light receiver for receiving the detection beam, projected by the light projector, and then detecting the object based on the amount of light received thereby.

According to the present invention, since the transmitting device is driven by the electric cell in the detecting unit, there is no need to use any electric cell for the transmitting device. Also, since the light projector of the detecting unit transmits not only the detection information signal, but also the low battery signal from the transmitting device, there is no need to use any low battery state transmitting device. Accordingly, with a low cost and simplified structure, the low battery signal of the electric cell can be transmitted.

In a preferred embodiment of the present invention, the detecting unit includes a low battery detecting circuit built therein for detecting a low battery state, in which the voltage of the electric cell in the detecting unit is lower than a first reference signal, and in which the transmitting device comprises a low battery determining circuit built therein for determining whether or not the voltage supplied from the electric cell is lower than a second reference value. Accordingly, when the voltage supplied from the electric cell is in a low battery state, the low battery signal can be transmitted by the transmitting device.

In another preferred embodiment of the present invention, the object detecting device further includes an electric power sharing unit for outputting a supply voltage towards the transmitting device in response to the voltage from the electric cell and in which the electric power sharing unit comprises a voltage changing circuit for determining, based on a low battery detection result from the low battery detecting circuit, changing to a voltage necessary for causing the low battery determining circuit of the transmitting device to change the supply voltage from the electric cell to a voltage for determining a low battery state that is lower than the second reference value. Accordingly, the low battery state can be determined easily by the low battery determining circuit built in the transmitting device.

In a further preferred embodiment of the present invention, the voltage changing circuit is provided with a plurality of change voltages and the electric power sharing unit includes a changeover switch for changing the change voltage by the voltage changing circuit in dependence on a type of the transmitting device used. Accordingly, the various types of transmitting devices can be connected.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Figure 1:
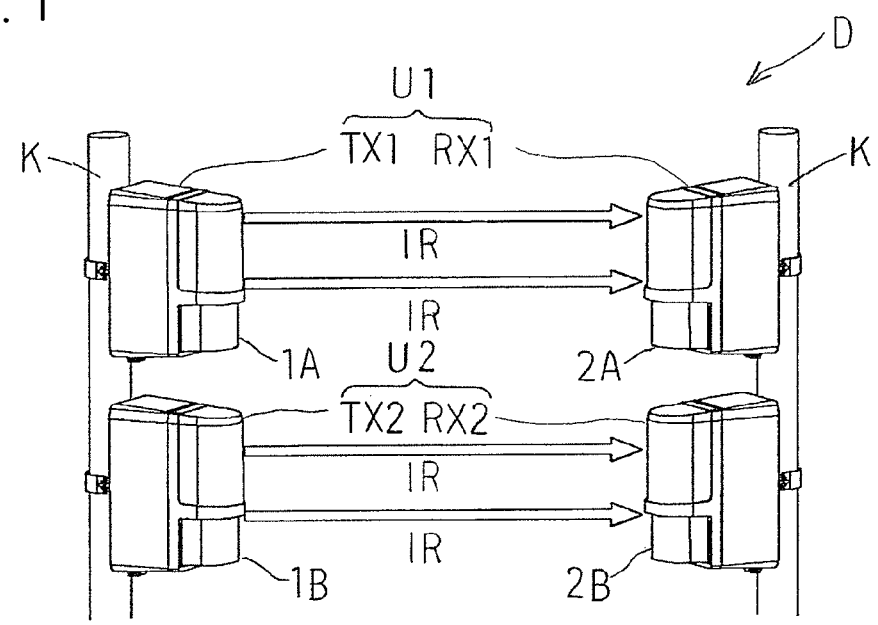
FIG. 1 is a perspective view showing a battery-operated object detecting device designed in accordance with a preferred embodiment of the present invention.
Figure 2:
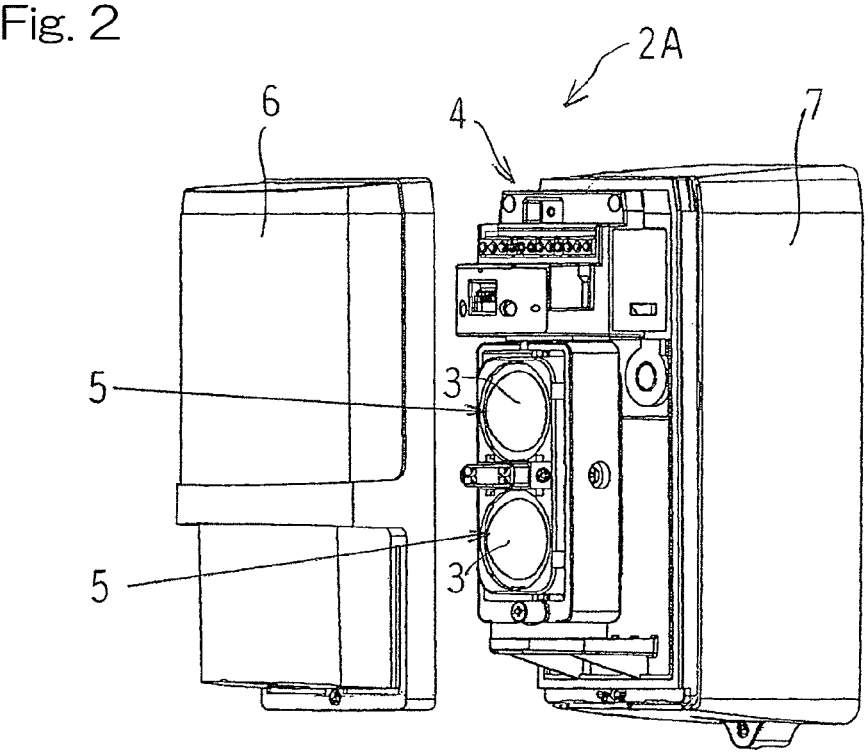
FIG. 2 is an exploded view of the object detecting device of FIG. 1 as viewed from front.
Figure 3:
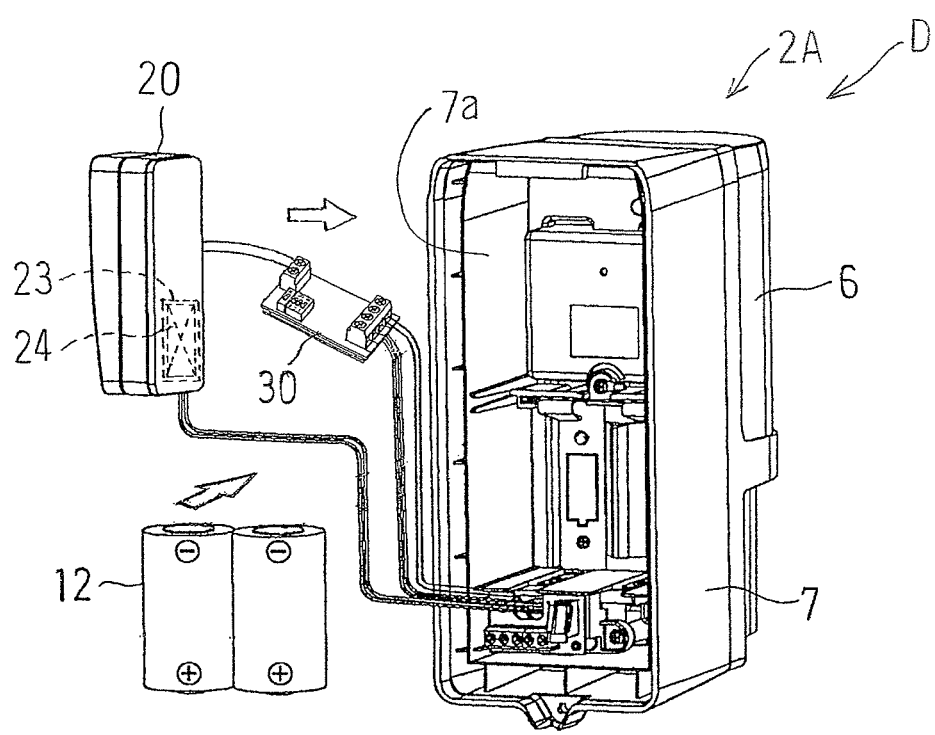
FIG. 3 is an exploded view of the object detecting device of FIG. 1 as viewed from rear.

Hereinafter a preferred embodiment of the present invention will be described in detail with reference to the accompanying drawings. In particular, FIG. 1 illustrates a perspective view showing an outer appearance of a battery-operated object detecting device pertaining to the preferred embodiment of the present invention. FIG. 2 illustrates an exploded view as viewed from a front side of FIG. 1. FIG. 3 is an exploded view as viewed from a rear side of FIG. 1. As shown in FIG. 1, the AIR type object detecting device, now generally identified by D, includes two sets of detecting units U1 and U2 each including a first light projector 1A and a second light projector 1B (TX1 and TX2), which are arranged one above the other, a first light receiver 2A and a second light receiver 2B (RX1 and RX2), which are similarly arranged one above the other and disposed in face to face relation with the first and second light projectors 1A and 1B, respectively, for receiving associated detection beams such as, for example, infrared beams IR transmitted from the corresponding first and second light projectors 1A and 1B. The first and second light projectors 1A and 1B and the first and second light receivers 2A and 2B are mounted respectively on respective support structures K such as, for example, poles or building walls.

FIG. 2 illustrates only the light receiver 2A as a representative of the first and second light projectors 1A and 1B and the first and second light receivers 2A and 2B, which receiver 2A is shown as including two light receiving optical systems 5 each made up of a light receiving element (not shown) for receiving a detection beam and a lens 3. The light projector includes two light projecting optical systems each made up of a light projecting element for projecting a detection beam towards the light receiver and a lens. The light receiver 2A is accommodated within a casing made up of a sensor covering 6 and a back box 7, and a sensor main body 4 is accommodated within this sensor covering 6. The object detecting device D shown in FIG. 1 is used in, for example, a security device for outputting a warning signal as a detection information signal resulting from the detection of an object, and when the infrared beam IR from the transmitter 1A is intercepted, an object is detected in reference to a change in signal level of the detection signal received by the opposed receiver 2A and a warning signal is subsequently outputted.

As shown in FIG. 3, the light receiver 2A is such that an electric cell (battery) 12 for driving the light receiver 2A and a transmitting device 20 for transmitting warning and low battery signals to the receiver are accommodated within the interior 7a of the back box 7. The light receiver 2A of this object detecting device D makes use of only one transmitting device 20 unlike the conventional one. Also, no electric cell is provided in an electric cell storage chamber 23 thereof, but in order for an electric power to be supplied from the electric cell 12 through the cell storage chamber 23, a dummy electric cell 24 as will be described later is instead accommodated therein in place of the electric cell. Also, since the transmitting device 20 does not have any electric cell, there is no need for it to transmit any low battery signal. In addition, an electric power sharing unit 30 for outputting a supply voltage to the transmitting device 20 in response to a voltage from the electric cell 12 is provided within the interior 7a of the back box 7.

Figure 4:
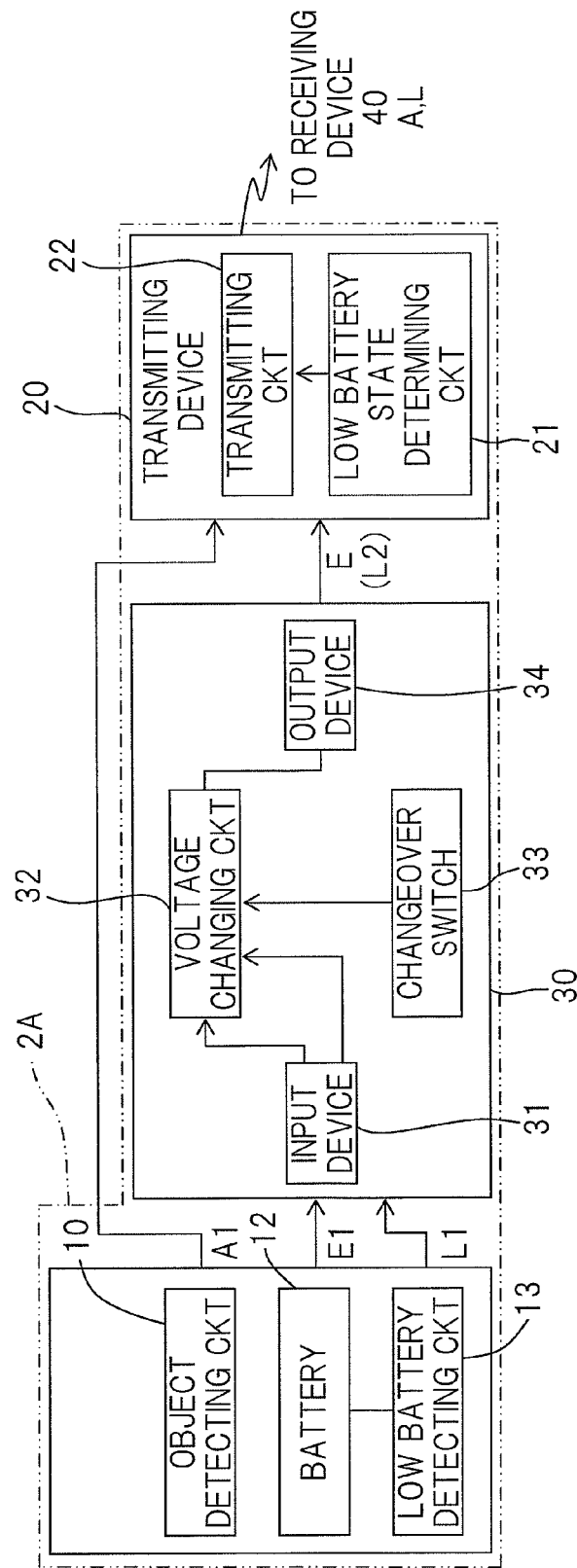
FIG. 4 is a circuit block diagram showing a light receiver employed in the object detecting device.

FIG. 4 illustrates a block diagram showing an electric system including the transmitting device 20 and the electric power sharing unit 30 both included in the light receiver 2A. The light receiver 2A includes an object detecting circuit 10, operable to detect an object in reliance on a change in the detection signal level and then to output a warning signal A1 to the transmitting device 20, the electric cell 12 referred to previously, and a low battery detecting circuit 13 operable to detect a reduction of voltage of the electric cell 12 by comparing it with a first reference value. It is to be noted that no object detecting circuit 10 for detecting the object such as in each of the light receivers 2A and 2B is employed in each of the light projectors 1A and 1B. The transmitting device 20 includes a low battery state determining circuit 21 for determining whether or not the voltage, supplied from the electric cell 12 in the light receiver 2A (the detecting unit U1) is a low electric cell having decreased down to a value lower than a second reference value set for each of the various transmitting devices 20, and a transmitting circuit 22 for transmitting the warning signal A and the low battery signal L, indicative of the reduction in voltage of the electric cell 12. Based on the receipt of the low battery signal L referred to above, the electric cell 12 of which voltage has been lowered, is replaced with a new electric cell having a predetermined voltage.

The electric power sharing unit 30 shown in FIG. 4 includes an input device 31, a voltage changing circuit 32, a changeover switch 33 and an output device 34. The input device 31 is adapted to input a voltage E1 supplied from the electric cell 12 and a low battery signal (low battery detection result), which is lower than the first reference value, to the electric power sharing unit 30. The voltage changing circuit 32 is operable to output, on the basis of a first low battery signal L1, a second low battery signal L2 which is a voltage changed from the voltage E1 supplied from the electric cell 12 and necessary to cause the low battery state determining circuit 21 in the transmitting device 20 to determine a low electric cell that is lower than the second reference value.

For the voltage changing circuit 32, any known circuit such as, for example, a regulator (control IC) is employed. In this voltage changing circuit 32, a plurality of change voltages are provided beforehand. The changeover switch 33 performs a changeover of the change voltage, provided for by the voltage changing circuit 32, in dependence on the type of the transmitting device 20 used. The output device 34 is operable to output to the transmitting device 20, the voltage E, which is to be supplied to the transmitting device 20 and which is supplied from the electric cell 12 through the voltage changing circuit 32, and which is also a low battery signal E (L2) of a voltage which has been changed. It is to be noted that if the drive voltage of the transmitting device 20 is different from the voltage of the electric cell 12, such voltage is supplied after having been changed by the voltage changing circuit 32.

Figure 5:
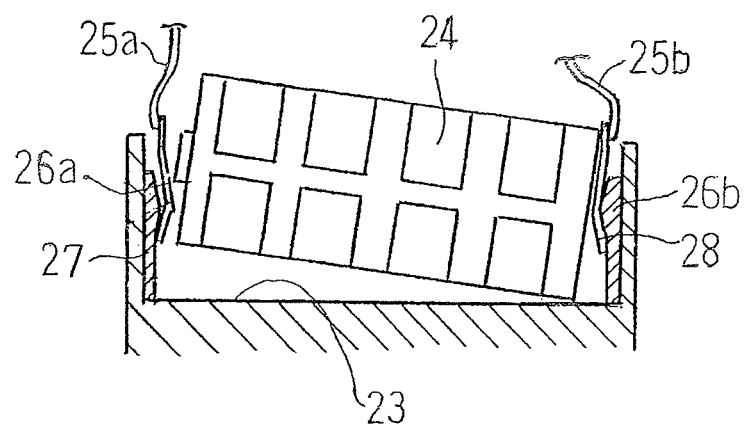
FIG. 5 is a schematic side view showing an electric cell storage chamber within a transmitting device.

Within the transmitting device 20 shown in FIG. 3, in place of the electric cell, the dummy electric cell 24 made of a resinous material and formed to the substantially same size as that electric cell, is accommodated within the electric cell storage chamber 23. As shown in FIG. 5, after contact pieces 26a and 26b connected with free ends of power supply lines 25a and 25b have been assigned as positive and negative pole terminals 27 and 28 of the electric cell storage chamber 23, respectively, the dummy electric cell 24 is urged to nest within the electric cell storage chamber 23. By so doing, with the contact pieces 26a and 26b sandwiched between the dummy electric cell 24 and the positive and negative pole terminals 27 and 28, respectively, the contact pieces 26a and 26b are electrically connected with the positive and negative pole terminals 27 and 28 and, with no need to modify, or alter in any way whatsoever, the structure within the transmitting device 20, mere placement of the dummy electric cell 24, in place of the electric cell, within the electric cell storage chamber 23 allows the voltage E, supplied from the electric cell 12 through the electric cell storage chamber 23, to be supplied to the transmitting device 20.

Figure 6:
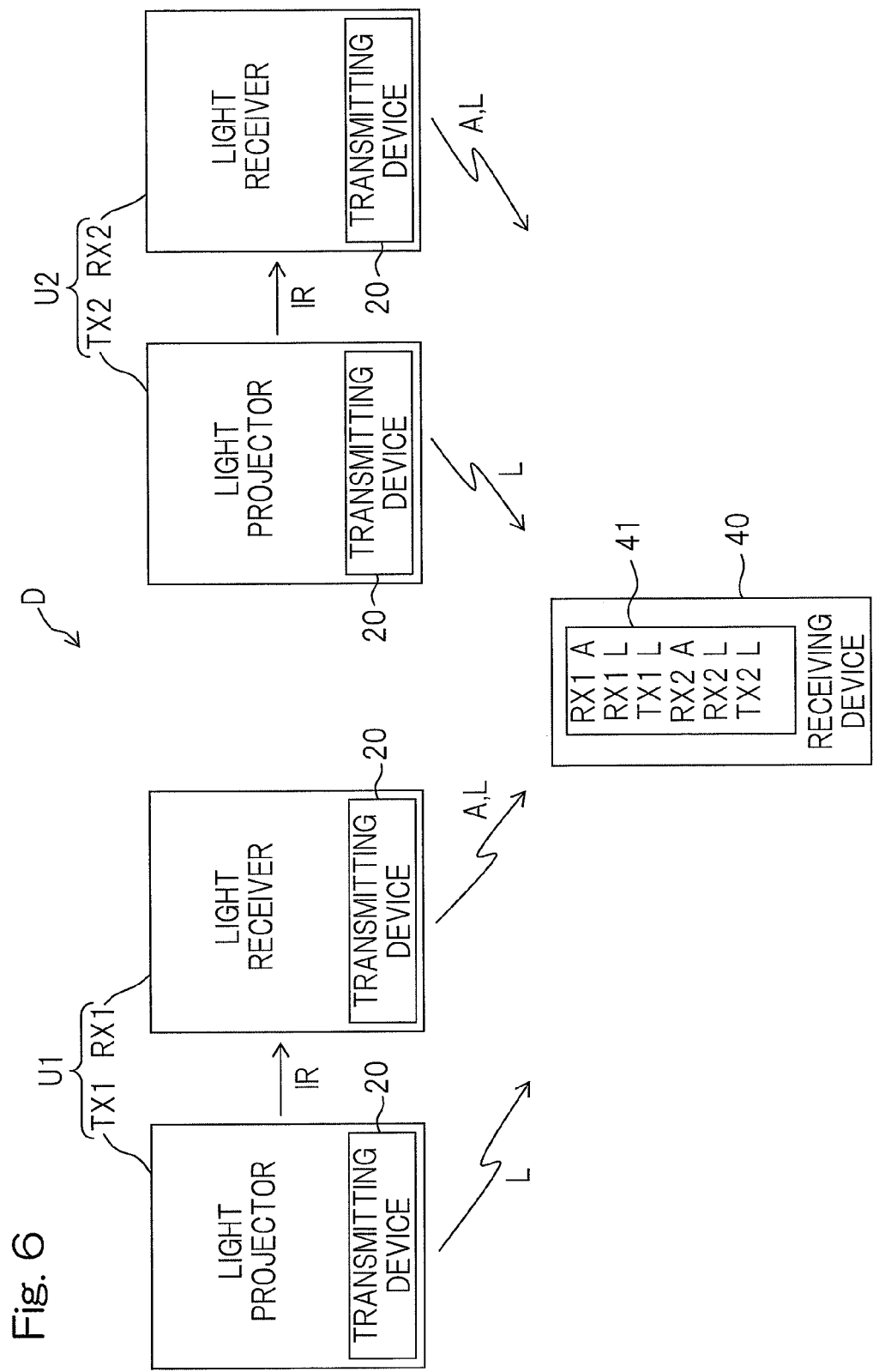
FIG. 6 is a diagram showing one example of a structure of the object detecting device.
Figure 7:
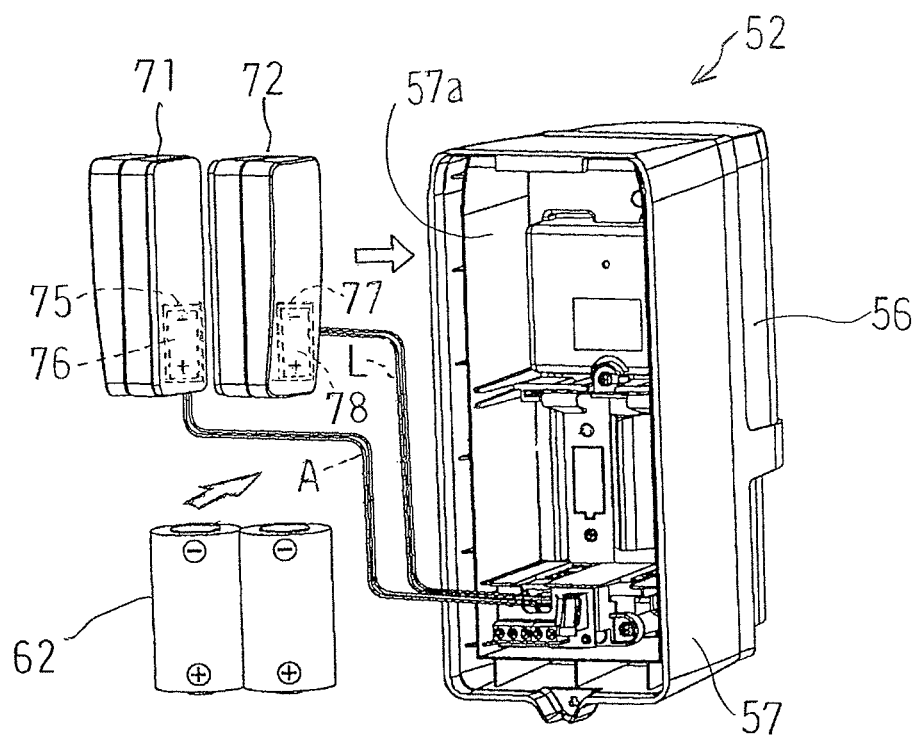
FIG. 7 is a perspective view showing the structure of the conventional light receiver.

FIG. 6 illustrates a diagram showing the object detecting device D and an arrangement of a receiving device 40 provided outside the object detecting device D. The object detecting device D shown therein includes detecting units U1 and U2, each made up of a plurality of, for example, two, sets of a light projector and a light receiver, and the warning signal A and the low battery signal L, fed from each of the transmitting devices 20, 20, are received by a receiving channel section 41 of the receiving device 40. In the receiving channel section 41, for each of the detecting units U1 and U2, one channel of the transmitting device 20 for transmitting the warning signal A and the low battery signal L in each of the light receivers RX1 and RX2 and one channel of the transmitting device 20 for transmitting the low battery signal L in each of the TX1 and TX2, totaling two channels, are required. For example, in the detecting unit U1, three channels are needed for RX1 A and L, RX1 A and L, and TX1 L. For this reason, in the two detecting units U1 and U2, summarizing those channels results in 3 (channels)×2 (sets)=6 channels in total and, in the case of the receiving device 40 whose receiving channel section 41 is an 8-channel, one receiving device 40 serves the purpose and, unlike the conventional 12 channels described hereinbefore, a low cost can be achieved.

As hereinabove described, in the practice of the present invention, since the transmitting devices 20, 20 of the light projectors 1A and 1B and the light receivers 2A and 2B in those detecting units U1 and U2 are driven by the respective batteries 12, 12, no electric cell is needed in the transmitting devices 20, 20. Also, since the light receivers 2A (2B) transmits not only the detection information signal (warning signal) from the transmitting device 20, but also the low battery signal, no transmitting device for the low electric cell is needed. Accordingly, the low battery signal of the electric cell can be transmitted at a low cost and with a simplified structure.

It is to be noted that although in describing the foregoing preferred embodiment of the present invention the object detecting device has been shown and described as used in a security device for outputting the warning signal as the detection information signal, the present invention is not necessarily limited thereto and may be used in association with an automatic door for outputting a open/close signal.

It is also to be noted that although in describing the preferred embodiment of the present invention, the present invention has been shown and described as applied to the AIR type object detecting device, the present invention may be equally applied to the PIR type object detecting device. Also, although the infrared rays have been referred to as the detection beam in the foregoing description of the preferred embodiment of the present invention, the detection beam may not necessarily be limited thereto and may be employed in the form of visible rays of light, microwave or laser.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERAL 1A, 1B: Light projector
2A, 2B: Light receiver
12: Electric cell (Battery)
13: Low battery detecting circuit
20: Transmitting device
21: Low battery determining circuit
30: Electric power sharing unit
32: Voltage changing circuit
33: Changeover switch
40: Receiving device
D: Object detecting device
U1, U2: Detecting unit
A: Detection information signal (Warning signal)
E: Supplied voltage
L: Low battery signal

What is claimed is:

1. A battery-operated object detecting device for detecting an object and the outputting a detection information signal, the object detecting device comprises:
    a detecting unit adapted to be driven by an electric cell mounted thereon; and
    a transmitting device driven by the electric cell in the detecting unit for transmitting wireless at least a low battery signal from the detecting unit and the detection information signal, the low battery signal being indicative of a reduction in voltage of the electric cell;
    wherein the detecting unit comprises a low battery detecting circuit built therein for detecting a low battery state, in which the voltage of the electric cell in the detecting unit is lower than a first reference signal, and
    wherein the transmitting device comprises a low battery determining circuit built therein for determining whether or not the voltage supplied from the electric cell is lower than a second reference value.

2. The battery-operated object detecting device as claimed in claim 1,
    further comprising an electric power sharing unit for outputting a supply voltage towards the transmitting device in response to the voltage from the electric cell and
    in which the electric power sharing unit comprises a voltage changing circuit for changing, based on a low battery detection result from the low battery detecting circuit, to a voltage necessary for causing the low battery determining circuit of the transmitting device to change the supply voltage from the electric cell to a voltage for determining a low battery state that is lower than the second reference value.

3. The battery-operated object detecting device as claimed in claim 2,
    in which the voltage changing circuit is provided with a plurality of change voltages and
    in which the electric power sharing unit comprises a changeover switch for changing the change voltage by the voltage changing circuit in dependence on a type of the transmitting device used.

* * * * *